Oct. 7, 1930.  L. E. STUART  1,777,985
TRACTOR DRAWN CULTIVATOR
Filed Sept. 24, 1929   2 Sheets-Sheet 1
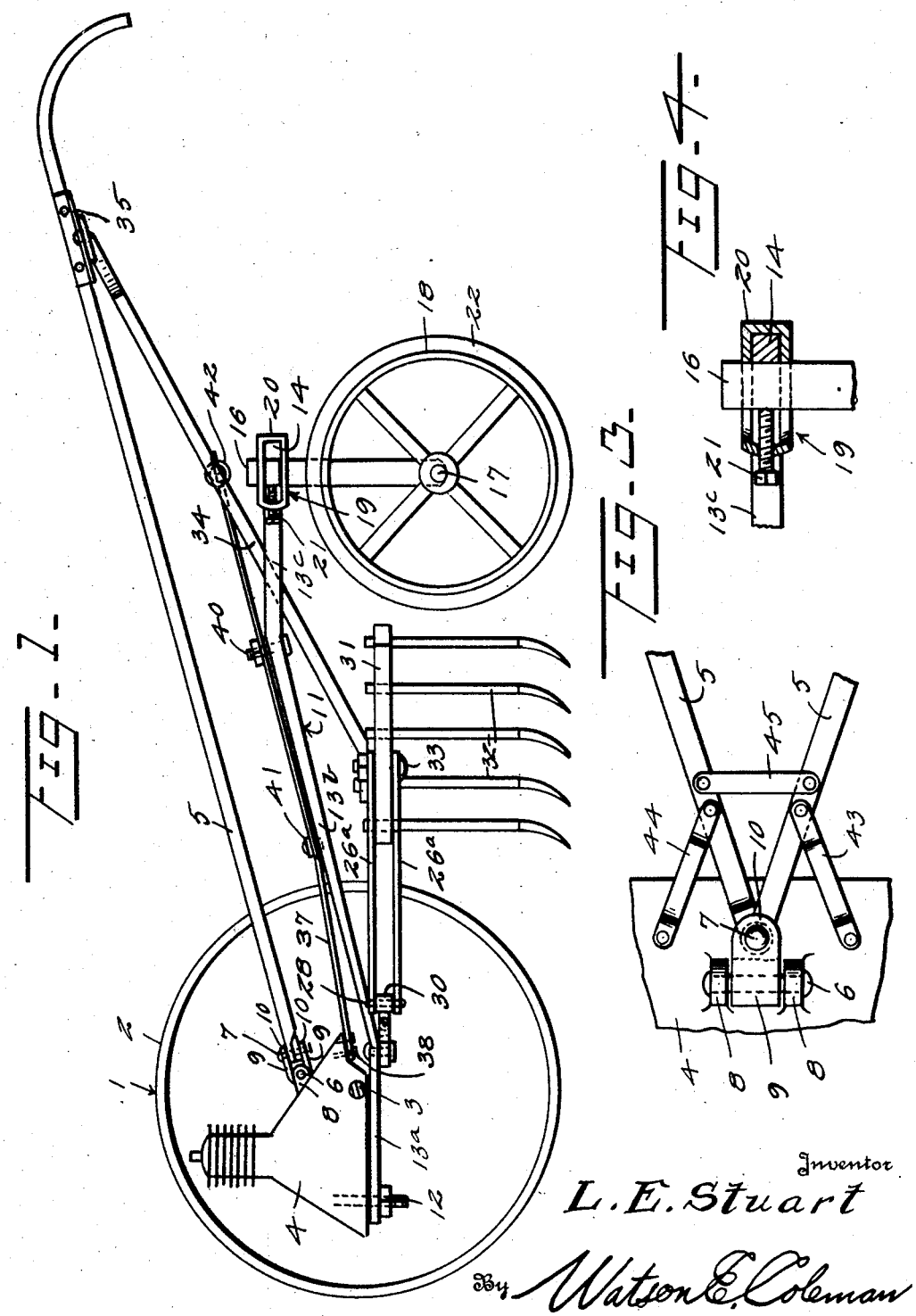
Inventor
L. E. Stuart
By Watson E. Coleman
Attorney

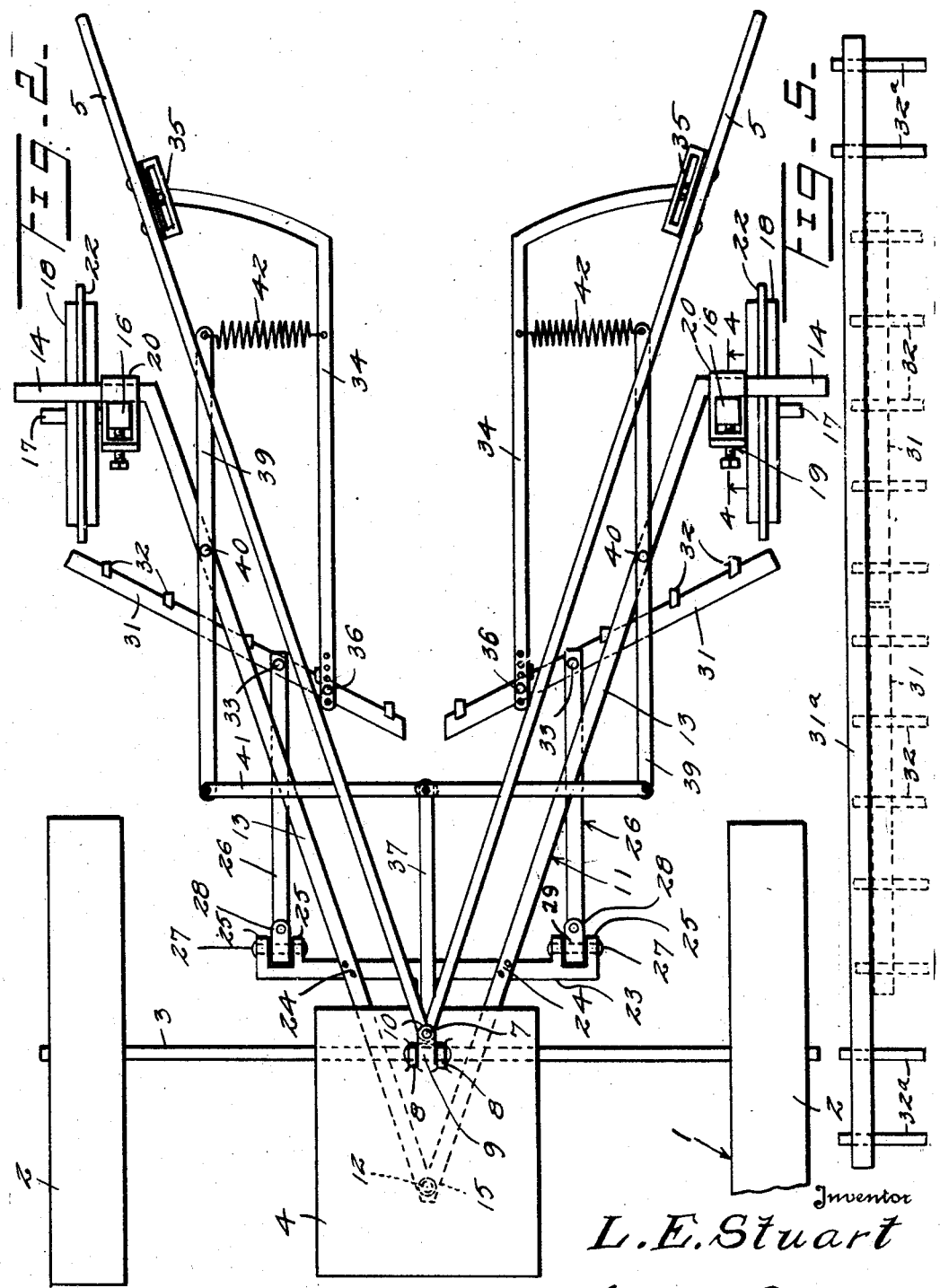

Patented Oct. 7, 1930

1,777,985

UNITED STATES PATENT OFFICE

LEW E. STUART, OF GLENDO, WYOMING

TRACTOR-DRAWN CULTIVATOR

Application filed September 24, 1929. Serial No. 394,854.

This invention relates to agricultural machines of that type embodying a tractor, and a cultivator consisting of two gangs of ground working implements adapted to work respectively at opposite sides of the row of plants under cultivation.

The invention has for one of its objects to provide an agricultural machine of the character stated wherein the gangs of ground working implements shall be so mounted as to permit them to be moved simultaneously in and out around the plants to the end that all or substantially all of the weeds may be destroyed.

The invention has for a further object to provide an agricultural machine of the character stated wherein the gangs of ground working implements shall be so mounted as to permit them to be moved independently in and out around the plants to the end that all or substantially all the weeds may be destroyed.

The invention has for a further object to provide an agricultural machine of the character stated wherein the gangs of ground working implements shall be so mounted as to permit them to be adjusted laterally with respect to each other and to the row of plants to the end that the implements may be caused to follow a crooked row of plants and to compensate for any deviation of a tractor with respect to the row of plants.

The invention has for a further object to provide an agricultural machine of the character stated which shall embody means associated with the gangs of ground working implements.

The invention has for a further object to provide an agricultural machine of the character stated which shall embody means adapted to effect an absolute automatic guiding or steering of the tractor by and as the result of maintaining the gangs of ground working implements in their normal positions at the sides of the row of plants.

The invention has for a still further object to provide an agricultural machine of the character stated wherein the tractor guiding or steering means shall be adapted to permit the simultaneous or independent adjustment of the gangs of ground working implements in and out around the plants without altering the direction of travel of the tractor.

The invention consists in the construction, combination and arrangement of parts hereinafter fully described and claimed, and illustrated in the accompanying drawings, wherein:—

Figure 1 is a view partly in side elevation and partly in vertical section of an agricultural machine constructed in accordance with my invention;

Figure 2 is a top plan view of the machine;

Figure 3 is a detailed view illustrating the manner in which the steering posts may be connected rigidly to the tractor;

Figure 4 is a sectional view illustrating the manner in which the wheel carrying posts are adjustably connected to the frame of the machine, and Figure 5 is a view illustrating the manner in which the machine may be converted into a multiple row cultivator.

Referring in detail to the drawings, 1 designates the tractor of the agricultural machine. As it may be of any well known or appropriate construction, the traction 1 is diagrammatically illustrated, the carrying wheels 2, axle 3 and engine 4 of the tractor being shown. The tractor 1 is provided with steering posts 5 which, in accordance with my invention, are connected to the engine 4 for simultaneous movement or adjustment about a horizontal axis 6 and for simultaneous or independent adjustment about a vertical axis 7. The pivot 6 is carried by lugs 8 cast on the engine 4, and the pivot 7 is carried by a sleeve 9 mounted upon the pivot 6 between the lugs. The pivot 7 extends through a pair of ears 10 carried by the sleeve 9 and through the front ends of the steering posts 5, which are arranged between the ears.

A frame 11 extends rearwardly from the tractor 1 and is pivotally connected at its front end to a stud or pin 12 extending downward from the lower side of the engine 4. The frame 11 comprises rearwardly diverging bars 13, which are connected at their front ends and are provided at their rear ends with outwardly directed arms 14. The bars 13 are provided at their connected front ends with an opening 15 for the reception of the pin or stud 12. Standards 16, which are provided at their lower ends with spindles 17 for wheels 18, are secured to the arms 14 by clamps 19, which establish an adjustable connection between the standards and arms so as to permit the frame 11 to be supported at the required height above the ground.

While the clamps 19 may be of any well known or appropriate construction, they are shown as comprising yokes 20, which embrace the arms 14 and standards 16, and set screws 21 carried by the yokes and engaging the standards.

The connection between the tractor 1 and the frame 11 is such as to permit the tractor to be turned with respect to the frame about the stud or pin 12 as an axis, the frame being held against lateral movement during the turning of the tractor by the wheels 18, which for this purpose are provided with ground engaging peripheral flanges 22.

The frame bars 13 have horizontal front portions 13$^a$ arranged beneath the engine 4, intermediate portions 13$^b$ extending upwardly and rearwardly from the front portions, and rear portions 13$^c$ extending horizontally from the intermediate portions. A cross bar 23 is arranged beneath and secured by bolts 24 to the rear ends of the horizontal bar portions 13$^a$. The cross bar 23 extends beyond the horizontal bar portions 13$^a$, and is provided at each end thereof with a pair of rearwardly directed ears 25.

Draft bars 26 are located below the frame 11 and extend rearwardly from the ends of the cross bar 23. The draft bars 26 are connected at their front ends to the cross bar 23 for movement about horizontal axes 27 and vertical axes 28. The pivots 27 pass through the lugs 25, sleeves 29 are mounted upon the pivots between the lugs, and the pivots 28 pass through spacing collars 30 carried by the sleeves. The draft bars 26 each consists of upper and lower members 26$^a$, which have their front ends arranged in contact with the upper and lower ends of the sleeves of the collars 30, the pivots 28 passing through said ends of the draft bar members.

Gang bars 31, each of which carries a plurality of cultivator blades 32, are connected to the rear ends of the draft bars 26 by bolts 33. Each gang bar 31 is arranged between the rear ends of the members 26$^a$ of each draft bar 26. The gang bars 31 are connected, at points inwardly beyond their transverse centers, to the draft bars 26, and they incline laterally and rearwardly from the longitudinal center of the machine when in normal position. The gang bars 31 are held against accidental turning movement with respect to the draft bars 26 by the bolts 33. Gang bar control arms 34 of angular formation are pivotally and slidably connected at their rear ends, as at 35, to the steering posts 5 at points rearwardly beyond the gang bars. The control arms 34 are secured at their front ends, as at 36, to the gang bars 31 inwardly beyond the connection of the gang bars with the draft bars 26.

A steering arm 37 is fixedly secured, as at 38, to the rear side of the engine 4 and extends upwardly and rearwardly from the engine. Longitudinally extending levers 39 are pivoted between their ends, as at 40, to the frame bars 13. The levers 39 have their front ends connected to the rear end of the steering arm 37 by links 41 and have their rear ends connected to the brace arms 34 by coil springs 42.

As the steering posts 5 are connected to the engine 4 for movement about the horizontal axis 6, as the draft bars 26 are connected to the frame 11 for movement about horizontal axes 27, and as the gang bars 31 are connected to the steering posts by the brace arms 34, the gangs of cultivator blades 32 may be lowered into or raised out of engagement with the ground through the medium of the steering posts, and the depth of penetration of the gangs of cultivator blades may be regulated through the medium of the steering posts.

As the steering posts 5 are pivotally connected to the engine 4 for simultaneous and independent movement about the upwardly and forwardly inclined axis 7, as the draft bars 26 are connected to the frame 11 for simultaneous or independent movement about the vertical axis 28, and as the gang bars 31 are connected to the steering posts by the control arms 34, the gangs of cultivator blades 32 may be moved, through the medium of the steering posts, simultaneously or independently in and out around the plants to the end that all or substantially all of the weeds may be destroyed, and they may be adjusted laterally with respect to each other and to the row of plants to the end that they may be caused to follow a crooked row of plants and to compensate for any deviation of the tractor with respect to the row of plants.

The arm 37, levers 39 and the links 41 constitute the tractor steering means. The springs 42, through the medium of which the levers 39 are connected to the brace arms 34, permit the gangs of cultivator blades 32 to be adjusted in and out around the plants, to be adjusted so as to follow a crooked row of plants or to compensate for any deviation of the tractor without altering the direction of the tractor. When, however, the steering posts 5 are adjusted to maintain the gangs of cultivator blades 32 in their normal position at opposite sides of the row of plants, the steering means functions to guide the tractor in the direction of the length of the row of plants.

The gang bars 31 may be arranged at any desired or required angle with respect to the longitudinal center of the machine, and they may be arranged in alinement transversely of the machine when it is desired to use it for the purpose of cultivating a plurality of rows of plants.

When the machine is used for this purpose, an auxiliary gang bar 31ª provided with additional cultivator blades 32ª is secured to the alined gang bars 31 by the bolts 33, as shown in Figure 5. The connection established by the bolts 33 between the gang bars 31 and the auxiliary gang bar 31ª is loose so as to permit the gang bars to be moved laterally through the medium of the steering post 5. When it is desired to use the tractor for purposes other than the cultivation of plants, the steering posts 5 are secured against movement with respect to the tractor by links 43, 44 and 45, as shown in Figure 3.

It should be understood from the foregoing description, taken in connection with the accompanying drawings, that the gangs of cultivator blades may be readily adjusted laterally with respect to each other and to the plants, readily adjusted laterally and simultaneously with respect to the plants, and readily maintained in a normal position at the opposite sides of the plants, and that the tractor will be automatically steered while the operator is devoting his entire attention to the cultivation of the plants.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. In combination, a tractor, a frame pivoted at its front end to the tractor, ground engaging wheels supporting the rear end of the frame, draft bars connected to the frame for movement about vertical and horizontal axes, gang bars connected to the draft bars and arranged at an angle to the longitudinal center of the frame and tractor, ground working implements secured to the gang bars, gang bar steering posts connected to the tractor for movement about a horizontal axis and an axis inclined with respect to the vertical, and arms connecting the steering posts to the gang bars whereby to swing the gang bars vertically or horizontally coactively with the vertical or horizontal swinging of said steering posts.

2. In combination, a tractor, a frame pivoted at its front end to the tractor, ground engaging wheels supporting the rear end of the frame, draft bars connected to the frame for movement about vertical and horizontal axes, gang bars connected to the draft bars and arranged at an angle to the longitudinal center of the frame and tractor, ground working implements secured to the gang bars, gang bar steering posts connected to the tractor for simultaneous movement about a horizontal axis and for simultaneous or independent movement about an axis inclined with respect to the vertical, and arms connecting the steering posts to the gang bars whereby to swing the gang bars vertically or horizontally coactively with the vertical or horizontal swinging of said steering posts.

3. In combination, a tractor, a frame pivoted at its front end to the tractor, ground engaging wheels supporting the rear end of the frame, draft bars connected to the frame for movement about vertical and horizontal axes, gang bars connected to the draft bars and arranged at an angle to the longitudinal center of the frame and tractor, ground working implements secured to the gang bars, steering posts connected to the tractor for movement about a horizontal axis and an axis inclined with respect to the vertical, arms connecting the steering posts to the gang bars, a steering arm fixed to the tractor and extending rearwardly therefrom, levers pivotally connected between their ends to the frame and extending longitudinally of the frame, springs connecting the rear ends of the levers to said first arms, and links connecting the front ends of the levers to the rear end of the steering arm.

4. In combination, a tractor, a frame pivoted at its front end to the tractor, ground engaging wheels supporting the rear end of the frame, draft bars connected to the frame for movement about vertical and horizontal axes, gang bars connected to the draft bars and arranged at an angle to the longitudinal center of the frame and tractor, ground working implements secured to the gang bars, steering posts connected to the tractor for simultaneous movement about a horizontal axis and for simultaneous or independent movement about an axis inclined with respect to the vertical, arms connecting the steering posts to the gang bars, a steering arm fixed to the tractor and extending rearwardly therefrom, levers pivotally connected between their ends to the frame and extending longitudinally of the frame, springs connecting the rear ends of the levers to said first arms, and links connecting the front ends of the levers to the rear end of the steering arm.

5. In combination, a tractor, a frame pivoted at its front end to the tractor, ground engaging wheel supporting the rear end of the frame, gang bar steering posts pivotally connected to the tractor, draft bars pivotally connected to the frame, gang bars connected to the draft bars, ground working implements secured to the gang bars, and means connecting the steering posts to the gang bars whereby to swing the gang bars vertically or horizontally coactively with the vertical or horizontal swinging of said steering posts.

6. In combination, a tractor, a frame pivoted at its front end to the tractor, ground engaging wheels supporting the rear end of the frame, steering posts pivotally connected to the tractor, draft bars pivotally connected to the frame, gang bars connected to the draft bars, ground working implements secured to the gang bars, means connecting the steering posts to the gang bars, a steering arm fixed to the tractor, and means establishing an operative and yielding connection between the steering arm and said first means.

In testimony whereof I hereunto affix my signature.

LEW E. STUART.